Figure 1:
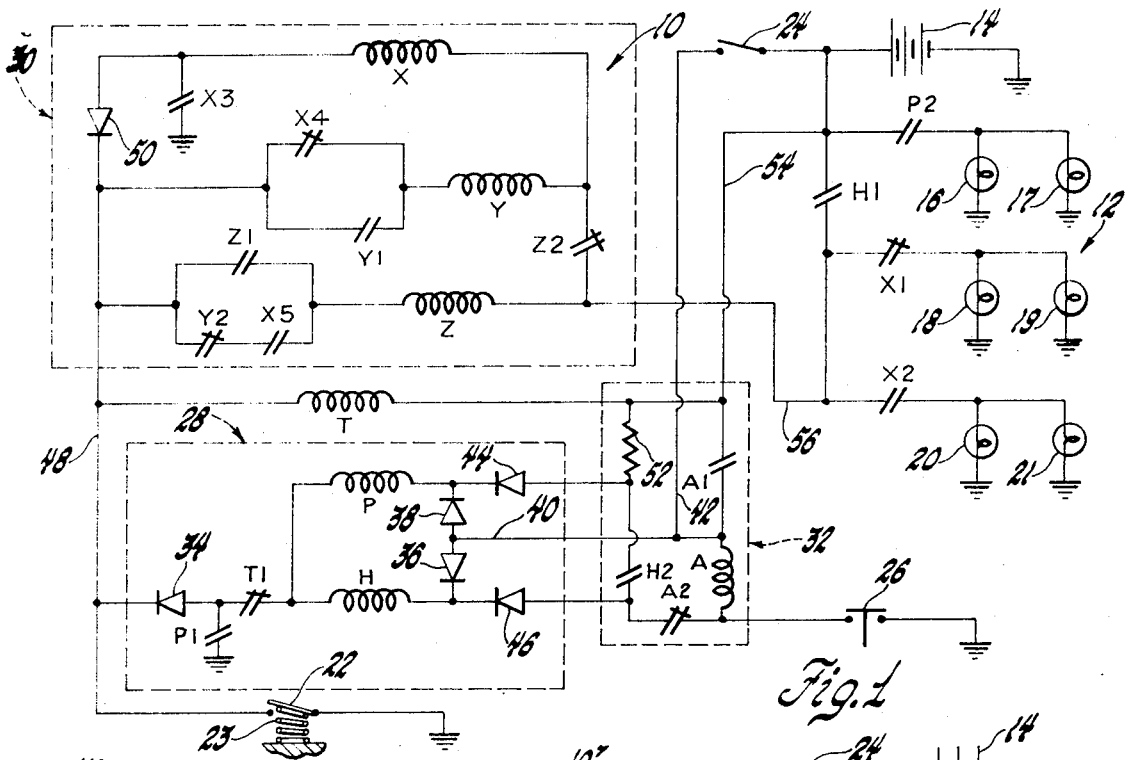

United States Patent [19]
Ballou

[11] 3,748,529
[45] July 24, 1973

[54] LIGHT CONTROL CIRCUIT
[75] Inventor: Richard P. Ballou, Howell, Mich.
[73] Assignee: General Motors Corporation, Detroit, Mich.
[22] Filed: May 16, 1972
[21] Appl. No.: 253,783

[52] U.S. Cl. ............................................. 315/83
[51] Int. Cl. ............................................ B60q 1/04
[58] Field of Search ............................... 315/82, 83

[56] References Cited
UNITED STATES PATENTS
3,530,333   9/1970   Roberts ............................... 315/83

Primary Examiner—Roy Lake
Assistant Examiner—James B. Mullins
Attorney—E. W. Christen and C. R. Meland et al.

[57] ABSTRACT

Apparatus for controlling the energization of vehicle headlamps and parking lamps in response to the settings of a light switch, an ignition switch, and a door responsive switch. In a first embodiment the parking lights are energized when the light switch is momentarily closed and deenergized when it is held closed for a predetermined time. The headlamps are similarly energized and deenergized when the ignition switch is in a vehicle operative setting. Momentary closure of the light switch while the headlamps are energized alternately energizes bright and low beam headlamps. The parking lamps and headlamps are automatically extinguished when the vehicle door is opened after the ignition switch is placed in a vehicle inoperative setting. In a second embodiment additional time delay circuitry is provided for maintaining the vehicle lamps energized for a predetermined time after the operator has left the vehicle.

3 Claims, 2 Drawing Figures

LIGHT CONTROL CIRCUIT

This invention relates to vehicle lighting circuits and, more particularly, to apparatus for controlling the energization of vehicle headlamps and parking lamps.

The apparatus which is presently widely employed to control the energization of vehicle headlamps includes a hand operated light switch mounted on the dashboard of the vehicle and a dimmer switch positioned so as to be foot operated by the vehicle operator to selectively energize the vehicle high and low beam headlamps. In most vehicles the light switch also controls energization of the vehicle parking lamps. Accordingly, the light switch is generally quite complex and the wiring to which the switches are connected is of an expensive nature. This system is proposed as an alternative that may be less expensive and provides both present and additional functions which may not be economically feasible with present systems.

It is therefore an object of this invention to provide apparatus for controlling the energization of vehicle headlamps and parking lamps by manipulation of a single light switch in such a way as to energize the vehicle lamps, deenergize the vehicle lamps, and select whether the high or the low beam headlamps are to be energized.

It is another object of this invention to provide a system that provides energization of vehicle headlamps and parking lamps by manipulation of a single light switch while the vehicle ignition switch is in a vehicle operative setting and automatically extinguishes the vehicle lamps when a door is opened after the vehicle ignition switch is placed in a vehicle inoperative setting, it being understood that for purposes of this application an ignition switch is one which has a first setting in which the vehicle is operative and a second setting in which the vehicle is inoperative.

It is yet another object of this invention to provide a vehicle lamp system in which the vehicle parking lamps and headlamps are energized by manipulation of a two position light switch, manually deenergized by manipulation of a selectively operable switch, automatically extinguishable by operation of ignition and door responsive switches, and automatically extinguishable a predetermined time after the vehicle has become inoperative.

Figure 2:
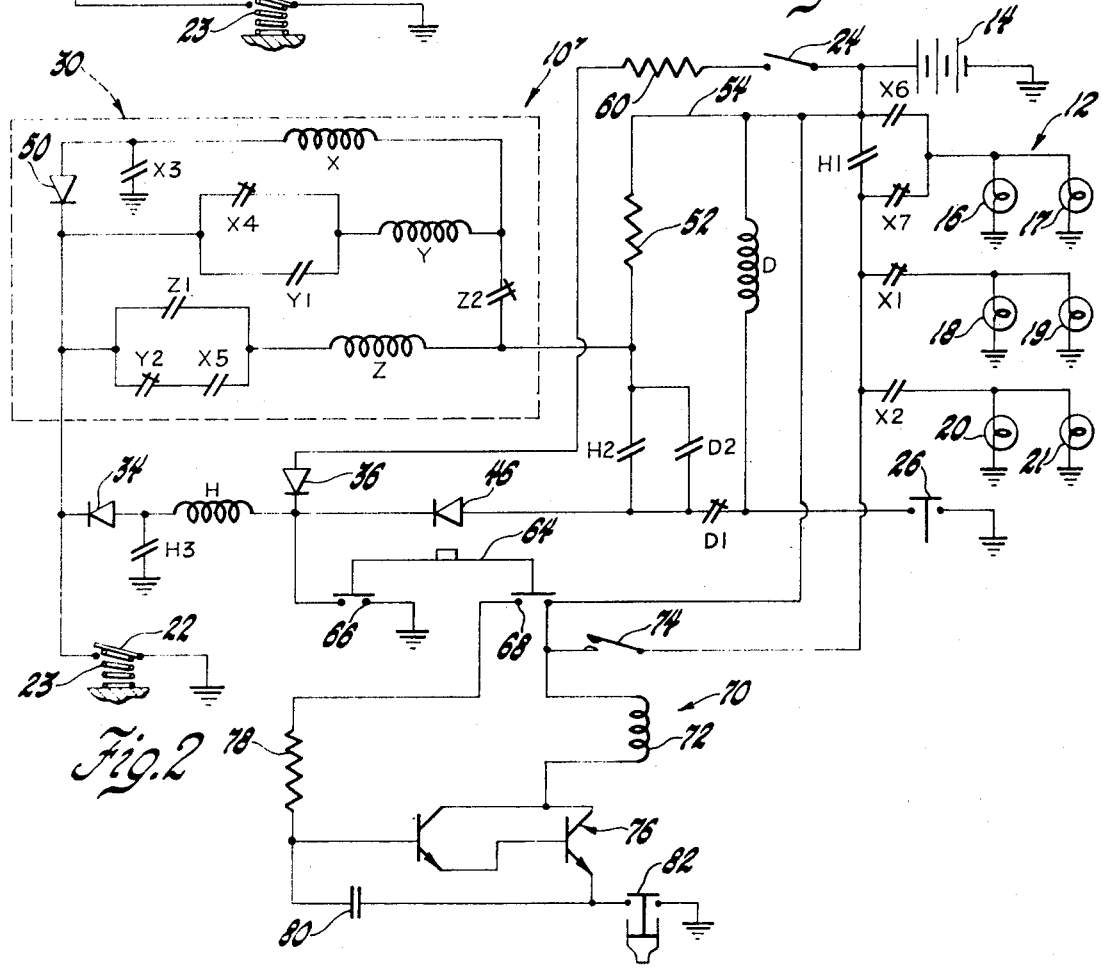

The foregoing and other objects and advantages of the subject invention will become apparent from the following description and accompanying drawings, in which:

FIG. 1 is a schematic diagram of a first embodiment of a vehicle light control circuit incorporating the principles of the subject invention; and FIG. 2 is a schematic diagram of an alternate embodiment of the subject invention disclosed in FIG. 1.

FIG. 1 EMBODIMENT

As shown in FIG. 1, the subject control circuit 10 controls the energization of various vehicle lamps 12 by a vehicle battery 14. The lamps 12 include parking lamps 16 and 17, a pair of headlamps 18 and 19 of the type generally described as high beam headlamps, and another pair of headlamps 20 and 21 of the type generally described as low beam headlamps. The control of the lamps 12 is provided by the control circuit 10 in accordance with the setting of a light switch 22 that is biased to an open setting by a spring 23, a vehicle ignition switch 24, and a normally closed door responsive switch 26 that is held open so long as the vehicle door with which it is associated remains closed. In addition, the control circuit 10 also includes a light energization network 28 for controlling the energization of the lamps 12, a lamp dimming network 30, for determining whether the high beam headlamps 18 and 19 are to be energized or whether the low beam headlamps 20 and 21 are to be energized, a lamp deenergization network 32 for automatically deenergizing the lamps 12 when the vehicle operator leaves the vehicle, and a slow acting time delay relay T that serves as a lamp extinguishing device for enabling the vehicle operator to turn off the lamps 12 without leaving the vehicle.

The lamp energization network 28 includes a relay H for effecting energization of the headlamps 18 through 21 and a relay P for effecting energization of the parking lamps 16 and 17. The relays H and P are connected through a set of normally closed contacts T1, which are operated by the time delay relay T, and a diode 34 to the light switch 22. The other sides of the relays H and P are connected through a pair of diodes 36 and 38 to a lead 40, which in turn is connected through a lead 42 to the ignition switch 24. Accordingly, upon closure of the ignition switch 24 and the light switch 22 the battery 14 energizes the relays H and P through the respective diodes 36 and 38.

When the relay H is energized it closes a set of normally open contacts H1 connected between the battery 14 and the headlamps 18 through 21 and also closes a set of normally open contacts H2 in the lamp deenergization network 32, the purpose of which will be subsequently described. When the relay P is energized it closes a set of normally open contacts P1 in the lamp energization network 28 so as to hold the relays H and P energized should the light switch 22 subsequetly be opened. The relay P also closes a set of normally open contacts P2 connected between the battery 14 and the parking lamps 16 and 17, which are then energized.

The lamp energization network 28 also includes a pair of diodes 44 and 46 that prevent current feedback from the lamp energization network 28 to the lamp deenergization network 32 but provide sufficient current from the lamp deenergization network 32 to maintain the relays H and P energized after the ignition switch 24 has been opened, as will also be subsequently described in detail.

The lamp dimming network 30 includes three relays X, Y, and Z for determining whether the high beam headlamps 18 and 19 or the low beam headlamps 20 and 21 are to be energized when the contacts H1 connecting the battery 14 to the headlamps 18 through 21 are closed. The relay X in the lamp dimmer network 30 controls a set of normally closed contacts X1 in series with the high beam headlamps 18 and 19 and a set of normally open contacts X2 in series with the low beam headlamps 20 and 21. Accordingly, energization of the headlamps 18 through 21 depends upon whether or not the relay X is energized.

The relay X also controls a set of normally open contacts X3 that serve to latch the relay X in an energized condition once it has been energized. In addition, the relay X also controls a set of normally closed contacts X4 in series with the relay Y and a set of normally open contacts X5 in series with the relay Z. The contacts X4 and X5 are connected in a contact arrangement with a set of normally open contacts Y1 and a set of normally closed contacts Y2 that are controlled by the relay Y.

THe contact arrangement also includes a set of normally open contacts Z1 and a set of normally closed contacts Z2 that are controlled by the relay Z in such a fashion as to control the deenergization of the relay X. Energization of the relay X is effected in response to momentary closure of the light switch 22, which has one side grounded and the other side connected through a lead 48 and a diode 50 to the relay X.

The lamp deenergization network 32 provides automatic deenergization of the lamps 12 whenever the door switch 26 is closed by opening of the door after the ignition switch 24 has been opened. If instead the door switch 26 is closed before the ignition switch 24 is opened the lamps then energized will remain energized after the door is closed, though subsequently opening the door will deenergize the lamps. To perform this control function the lamp deenergization netowrk 32 includes a relay A, a set of normally open contacts A1 and a set of normally closed contacts A2, each of which is operated by the relay A. A resistor 52 is also provided in the lamp deenergization netowrk 32 for preventing short circuits of the battery 14, as will be described in the following operational description.

OPERATIONAL DESCRIPTION OF FIG. 1

In the control circuit 10 of FIG. 1 the parking lamps 16 and 17 may be energized by momentarily closing the light switch 22. If the light switch 22 is closed before the ignition switch 24 is closed the battery 14 is connected through a lead 54 to the resistor 52 in the lamp deenergization network 32. The other side of the resistor 52 is connected through the diode 44, the relay P, the normally closed contacts T1, and the diode 34 to the light switch 22. Accordingly, momentary closure of the light switch 22 effects energization of the relay P through this current path. When the relay P is energized it closes the contacts P1 so as to prevent deenergization of the relay P when the switch 22 is released and also closes the contacts P2 so as to connect the battery 14 to the parking lamps 16 and 17. The parking lamps 16 and 17 may thus be energized by momentarily closing the light switch 22 while the ignition switch 24 is open.

After the parking lamps 16 and 17 have been energized they may be deenergized by holding the light switch 22 closed for a predetermined time that is sufficient for the lamp turnoff relay T to open the contacts T1. As previously mentioned, the relay T is a slow to operate relay that opens the contacts T1 a predetermined time after the relay T is energized. Such relays commonly employ a shading coil or an armature having a damped movement, though the particular relay employed as the relay T is not important for purposes of this invention. Accordingly, the relay T may be of any type which opens the contacts T1 after a predetermined time has elapsed from energization of the relay T. Satisfactory results have been obtained by using a relay as the relay T which opens the contacts T1 after the light switch 22 has been held closed for approximately four seconds. When the contacts T1 are opened they prevent energization of the relays H and P. Accordingly, by holding the light switch 22 closed the predetermined time the relay P and, hence, the parking lamps 16 and 17 are deenergized.

To energize the headlamps 18 through 21 the relay H must be energized so as to close the contacts H1. However, the diode 38 prevents energization of the relay H through the diode 44 and the resistor 52 in the current path just described. Accordingly, to energize the headlamps 18 through 21 it is necessary to close the ignition switch 24 so as to complete a current path through the leads 42 and 40, the diode 36, the relay H, and the light switch 22. When the ignition switch 24 is closed while the parking lamps 16 and 17 are deenergized, current supplied through the leads 42 and 40 energizes both of the relays H and P, the relay P being energized through the low impedance diode 38 rather than the resistor 52. When the relay P is energized it closes the contacts P1 and P2, the former latching the relays H and P in an energized condition and the latter energizing the parking lamps 16 and 17. Upon energization of the relay H the contacts H1 are closed so as to allow energization of either the high beam headlamps 18 and 19 or the low beam headlamps 20 and 21.

Upon closure of the contacts H1 the battery 14 is connected through the contacts H1, a lead 56, and the normally closed contacts Z2 to the relay X in the lamp dimming network 30. Since the light switch 22 is connected to the relay X through the lead 48 and the diode 50, the relay X becomes energized as soon as both the contacts H1 and the light switch 22 are closed. Upon energization of the relay X the contacts X1 are opened and the contacts X2 are closed so as to provide energization of the low beam headlamps 20 and 21. The relay X also closes the contacts X3 so as to maintain the relay X energized and thus keeps the low beam headlamps 20 and 21 energized. It is thus apparent that soon after the relay H is energized the low beam headlamps 20 and 21 become energized. Accordingly, whenever the headlamps 18 through 21 are to be operated the low beam headlamps 20 and 21 are first to be energized.

When power is first supplied to the lamp dimming network 30 through the contacts H1 and the lead 56 the relay Y is energized through the normally closed contacts X4. The relay Y is selected to be a relay which operates faster than the relay X so that it becomes energized and closes the contacts Y1 before the contacts X4 are opened due to energization of the relay X. The contacts Y1 thus maintain the relay Y energized so long as the light switch 22 is closed. In addition, energization of the relay Y opens the normally closed contacts Y2 so as to prevent energization of the relay Z when the contacts X5 are closed by the relay X. The relay Y remains energized and the relay Z remains deenergized until the light switch 22 is opened. Upon opening of the light switch 22 the ground path for the relay Y is opened so both the relays Y and Z are deenergized, but the relay X remained energized through the contacts X3 so as to keep the low beam headlamps 20 and 21 energized.

The high beam headlamps 18 and 19 may be energized and the low beam headlamps 20 and 21 deenergized by again closing the light switch 22. When the light switch 22 is closed while the low beam headlamps 20 and 21 are energized, the relay Z is energized through the normally closed contacts Y2 and the normally open contacts X5, which are held closed at that time by energization of the relay X. Upon energization of the relay Z the normally open contacts Z1 are closed so as to maintain the relay Z energized and the normally closed contacts Z2 are opened so as to deenergize the relay X. Upon deenergization of the relay X the normally closed contacts X1 are closed so as to energize the high beam headlamps 18 and 19 and the normally open contacts X2 are opened so as to deenergize the low beam headlamps 20 and 21. When the light switch 22 is opened the relay Z is deenergized, as are the relays X and Y, and the high beam headlamps 18 and 19 remain energized The vehicle operator may deenergize the high beam headlamps 18 and 19 and reenergize the low beam headlamps 20 and 21 merely by again momentarily closing the light switch 22 so as to cause the energization of the relay X as previously described.

Should the vehicle operator wish to deenergize all of the lamps 12 he may do so merely by holding the light switch 22 closed for the predetermined time so as to effect energization of the relay T. When the relay T is energized it opens the contacts T1 so as to preclude energization of the relays H and P. When the relays H and P are deenergized the contacts H1 and P2 open so as to preclude energization of the lamps 12. The vehicle operator may thus selectively deenergize the lamps 12 at any time by holding the ligth switch 22 closed for the predetermined time.

If the vehicle operator wishes to leave the vehicle but neglects to turn off any of the lamps 12, the lamp deenergization network 32 will automatically turn them off as he leaves the vehicle. For example, if it is assumed that both the parking lamps 16 and 17 and the high beam headlamps 18 and 19 are energized while the ignition switch 24 is closed, the relays H and P are supplied power through the lead 42 and the ignition switch 24. If the ignition switch 24 is opened by being placed in a vehicle inoperative setting, sufficient power is supplied from the battery 14 through the lead 54, the resistor 52, the normally open contacts H2, and the diodes 44 and 46 to maintain the relays H and P energized. Merely opening the ignition switch 24 does not, therefore, extinguish the lamps 12. However, if the vehicle door is opened after the ignition switch 24 has been opened, the door switch 26 is closed. Upon closure of the door switch 26 the resistor 52 is grounded through the contacts H2 and the normally closed contacts A2. The supply of power to the relays H and P is thus interrupted and they become deenergized, extinguishing the lamps 12 until such time as the vehicle operator again energizes them in the manner previously described. Of course, several door switches in parallel may be used in place of the door switch 26 to detect opening any of several vehicle doors if such is desired.

If the vehicle operator wishes to maintain the lamps 12 energized while leaving the vehicle he may do so by opening the door prior to opening the ignition switch 24. Upon opening the door the door switch 26 is closed and the relay A is energized through the ignition switch 24, the lead 42, and the lead 40. Upon energization of the relay A the normally open contacts A1 latch the relay A in an energized condition so long as the door switch 26 is closed. Should the ignition switch 24 subsequently be opened, power is supplied from the battery 14 through the lead 54 and the normally open contacts A1, which are then closed, to the lead 40. The relays H and P are thus maintained energized by current through the diodes 36 and 38. It should be noted that door switch 26 does not ground the resistor 52 under these conditions because the energized relay A holds the normally closed contacts A2 open. After the ignition switch 24 has been opened the vehicle door may be closed so as to open the door switch 26 without deenergizing the lamps 12. When the door switch 26 is opened the relay A is deenergized and the contacts A1 are opened, but the relay P remains energized through the resistor 52 and the diode 44 and the relay H remains energized through the resistor 52, the normally open contacts H2, and the diode 46. In effect the normally open contacts H2 serve to latch the relay H in an energized condition. The vehicle operator may thus leave thd vehicle with the lamps energized.

When the vehicle operator returns to the vehicle and opens the vehicle door the door switch 26 is immediately closed, grounding the resistor 52 through the normally closed contacts A2. This causes deenergization of the relay H and the headlamps which had been left energized. Since the normally open contacts H2 are closed at the time of opening the vehicle door, the diode 44 is also momentarily grounded so as to deenergize the relay P, which in turn deenergizes the parking lamps 16 and 17. When the vehicle operator returns to the vehicle the lamps which he had left energized are thus automatically extinguished upon opening the vehicle door.

FIG. 2 EMBODIMENT

In the embodiment of FIG. 2 most of the functions and nomenclature of elements of the control circuit 10 in FIG. 1 are retained, but the control circuit 10' of FIG. 2 also provides for automatically turning the lamps 12 off a predetermined time after the vehicle operator has left the vehicle. In addition, thd control circuit 10' of FIG. 2 allows the vehicle operator to operate the vehicle while having only the parking lamps 16 and 17 energized, though the vehicle operator must affirmatively select this operating condition. The control circuit 10 of FIG. 1 does not permit this operating mode as the headlamps 20 and 21 automatically were energized upon closure of the ignition switch 24 after the parking lamps 16 and 17 were energized.

In the FIG. 2 embodiment the relay H is energized through a resistor 60 and a diode 36, which are in series with the ignition switch 24. In addition to the contacts H1 which control the energization of the headlamps 18 through 21, the relay H also operates a set of normally open contacts H3 that are used in place of the contacts P1 for latching the relay H in an energized condition. Other modifications contained in the FIG. 2 embodiment include a time delay relay D connected between the battery 14 and the door switch 26. The time delay relay D operates a set of normally closed contacts D1 and a set of normally open contacts D2 connected in series between the resistor 52 and the door switch 26. The normally open contacts D2 are also connected in parallel with the normally open contacts H2 that are operated by the relay H.

The control circuit 10' also includes a pushbutton switch 64 that when pressed closes a first set of contacts 66 that ground the relay H and a second set of contacts 68 that connects the battery 14 to a time delay network 70, which permits automatic turning off of the vehicle lamps after the vehicle operator has left the vehicle. The time delay network 70 includes a relay winding 72 which operates a set of normally open contacts 74. Energization of the relay winding 72 is controlled by a pair of transistors 76 in a Darlington configuration, the conductivity of which is controlled by a charging network that includes a resistor 78 and a capacitor 80. A normally closed switch that is responsive to operation of the vehicle, such as an oil pressure switch 82 that is responsive to oil pressure in the vehicle engine, is connectdd between the time delay network 70 and ground to preclude operation of the time delay network 70 until such time as the vehicle engine is inoperative, as will now be explained.

OPERATIONAL DESCRIPTION OF FIG. 2

The parking lamps 16 and 17 in FIG. 2 may be energized by momentarily closing the light switch 22 when the ignition switch 24 is open. When the light switch 22 is closed the lamp dimming network 30 is energized by the battery 14 through the resistor 52 so as to energize the relay X, which closes a set of normally open contacts X6 in series with the parking lamps 16 and 17. Energization of the relay X also opens a set of normally closed contacts X7, which are also connected to the parking lamps 16 and 17, and operates the other contacts previously described in connection with FIG. 1. Upon closure of the contacts X6 the parking lamps 16 and 17 are energized by the battery 14. If light switch 22 is momentarily closed a second time the lamp dimming network 30 deenergizes the relay X so as to open the contacts X6 and deenergize the parking lights 16 and 17.

After the ignition switch 24 has been closed to operate the vehicle the headlamps 18 through 21 may be energized by closing the light switch 22. When the light switch 22 is closed the relay H is energized through the ignition switch 24, the resistor 60, and the diode 36. Once the relay H is energized it is latched in an energized condition by closure of the contacts H2 and H3. When the contacts H2 are closed a second source of power is provided the relay H from the battery 14 through the resistor 52 and the diode 46 while closure of the contacts H3 provide a continuous ground for the relay H. The relay H is thus held energized even after the light switch 22 is opened and causes power to be supplied by the battery 14 through the contacts H1 to the headlamps 18 through 21. Since the initial closure of the light switch 22 also effects energization of the relay X and the light dimming network 30, as previously explained, the relay contacts X2 are closed and the relay contacts X1 are opened so as to turn on the low beam headlamps 20 and 21. Subsequent closure of the light switch 22 will alternately cause energization of the high beam headlamps 18 and 19 and the low beam headlamps 20 and 21 in the manner previously explained in regard to FIG. 1.

The headlamps 18 through 21 are deenergized in the FIG. 2 embodiment by momentarily pressing the pushbutton switch 64 rather than holding the light switch 22 depressed for a predetermined time. When the pushbutton switch 64 is closed it grounds the relay H through the contact 66 so as to deenergize the relay H and the headlamps 18 through 21.

It should be noted that in the FIG. 2 embodiment the parking lamps 16 and 17 are continuously energized while the relay H is energized because the contacts X6 and X7 provide a continuous connection from the battery 14 to the parking lamps 16 and 17 regardless of whether the relay X is energized. Accordingly, if the relay X is deenergized when the relay H is deenergized to extinguish the headlamps 18 through 21 the parking lamps 16 and 17 are also extinguished as the contacts X6 are open. However, if the relay H is deenergized while the relay X is energized the parking lamps 16 and 17 will remain energized until the relay X is deenergized by subsequent closure of the light switch 22.

Should the vehicle operator open the ignition switch 24 and subsequently leave the vehicle while some of the lamps 12 are energized, the relay H and the lamp dimming network 30 are supplied power through the resistor 52. However, when the vehicle door is opened and the door switch 26 is closed this supply of power is interrupted by the ground circuit through the normally closed contacts D1 and the door switch 26. This interruption of power assures that the relays H and X are deenergized so as to preclude energization of the lamps 12. The relay D is selected to be a slow acting relay so that the contacts D1 remain closed for a sufficiently long time to assure deenergization of the relays H and X.

Should the vehicle operator wish to leave the vehicle with some of the lamps 12 energized for an indefinite period he may do so by opening the ignition switch 24 after opening the door. When the door is opened for a time sufficient for energization of the time delay relay D, which may be as brief as a second, the closure of the door switch 26 effects energization of the relay D, so as to open the contacts D1 and close the contacts D2, which close a current path from the resistor 52 to the relay H. While the resistor 52 is momentarily connected to ground through the contacts H2 and D1 and the door switch 26, the diode 46 prevents grounding the relay H. Thus the momentary loss of voltage supplied to the lamp dimming network 30 when the door switch 26 is closed will cause the relay X to become deenergized, but the relay H will remain energized by current from the current path that includes the ignition switch 24, the resistpr 60, and the diode 36 during this time. Once the relay D is energized and the contacts D1 opened the relay H is again energized through the resistor 52 and the diode 46. Accordingly, opening the vehicle door prior to opening the ignition switch 24 maintains the lamps 12 energized. When the vehicle door is closed the door switch 26 is opened and relay D deenergized, but energization of the relay H continues uninterrupted by virtue of the closed contacts H2. However, when the vehicle door is subsequently opened the door switch 26 will be closed so as to deenergize the relay H and cause deenergization of the lamps 12.

Should the vehicle operator wish to leave the vehicle with the lamps 12 energized for a predetermined time he may do so by pressing the pushbutton switch 64 after the vehicle engine has been stopped. When the vehicle engine has been stopped the oil pressure switch 82 is closed. Pressing the pushbutton switch 64 closes the contacts 66 to deenergize the relay H and closes the contacts 68 so as to rapidly charge the capacitor 80 from the battery 14 through the contacts 68 and the resistor 78, which is of relatively low resistance. Since the relay winding 72 is connected directly to the battery 14, the charge on the capacitor 80 foward biases the Darlington pair 76 so as to energize the relay winding 72. When the relay winding 72 is energized the contacts 74 are closed so as to bypass the contacts H1 and provide energization of the lamps 12. After the charge on the capacitor 80 has been drained by the Darlington pair, which occurs a predetermined time after the pushbutton switch 64 is released, the Darlington pair 76 becomes non-conductive so as to deenergize the relay winding 72 and open the contacts 74. By selecting the resistor 78 to have a low resistance the relay winding 73 may be energized and the contacts 74 closed as soon as the relay H is deenergized. Energization of the lamps 12 may thus be continuous until the lamps 12 are automatically deenergized a predetermined time after the pushbutton switch 64 has been momentarily pressed.

Inasmuch as the foregoing description has been directed toward only the two illustrated embodiments of this invention, persons versed in the art will appreciate that various other modifications of this may be made without departing from its spirit.

What is claimed is:

1. Apparatus for controlling the energization of vehicle high and low beam headlamps by a power source comprising, in combination, an ignition switch having a vehicle operative setting in which the vehicle is rendered operable and a vehicle inoperative setting in which the vehicle is rendered inoperable; a light switch having first and second operative positions, the light switch being biased to the first operative position; means responsive to the light switch position and to the ignition switch setting for alternately effecting energization of the high and low beam headlamps when the light switch is momentarily placed in the second operative position after the ignition switch has been placed in the vehicle operative setting, inital placement of the light switch in the second operative position causing said first means to effect energization of only the low beam headlamps and subsequent placement of the light switch in the second operative position causing said first means to deenergize the headlamps then energized and energize the headlamps then deenergized; lamp extinguishing means responsive to the light switch position for effecting deenergization of all of the headlamps when the ligth switch remains in the second position for a predetermined time; and a lamp deenergization circuit responsive to the ignition switch setting and a vehicle door for effecting deenergization of the high and low beam headlamps when the vehicle door is opened after placement of the ignition switch in the vehicle inoperative setting, the headlamps thereby being manually extinguishable by holding the light switch in the second operative position for the predetermined time and being automatically extinguishable when persons leave the vehicle by placement of the ignition switch in the vehicle inoperative setting prior to opening the vehicle door.

2. Apparatus for controlling the energization of vehicle high and low beam headlamps and parking lamps by a power source comprising, in combination, an ignition switch having a vehicle operative setting in which the vehicle is operable and a vehicle inoperative setting in which the vehicle is inoperable; a light switch adapted for movement between first and second positions and being biased to said first position; lamp energization means responsive to the switches for effecting energization of the lamps by the power source, said means effecting energization of the parking lamps upon initial momentary placement of the light switch in the second position and thereafter additionally effecting energization of the low beam headlamps when the ignition switch is placed in the vehicle operative setting, said means also effecting energization of the low beam headlamps and the parking lamps when the light switch is momentarily placed in the second position after the ignition switch is placed in the vehicle operative setting; lamp dimming means responsive to subsequent momentary placement of the light switch in the second position for deenergizing the energized headlamps and energizing the deenergized headlamps each time the light switch is momentarily placed in the second position; lamp extinguishing means responsive to the light switch for effecting deenergization of the vehicle lamps when the light switch remains in the second position for a predetermined time; a switch that is responsive to opening of one of the vehicle doors, the door responsive switch having a first setting when the door is closed and a second setting when the door is opened; and a lamp deenergization circuit responsive to the door responsive switch and the ignition switch for automatically effecting deenergization of the vehicle lamps when the door switch is placed in the second setting after the ignition switch has been placed in the vehicle inoperative setting so as to automatically extinguish the headlamps and parking lamps when the vehicle operator opens the door to leave the vehicle.

3. Apparatus for controlling the energization of vehicle high and low beam headlamps and parking lamps by a power source comprising, in combination, an ignition switch having a vehicle operative setting in which the vehicle is operable and a vehicle inoperative setting in which the vehicle is inoperable; a light switch adapted for movement between first and second positions and biased to said first position; lamp energization means responsive to the switches for effecting energization of the lamps by the power source, said means effecting energization of the parking lamps upon initial momentary placement of the light switch in the second position and thereafter additionally effecting energization of the low beam headlamps when the ignition switch is placed in the vehicle operative setting, said means also effecting energization of the low beam headlamps and the parking lamps when the light switch is momentarily placed in the second position after the ignition switch has been placed in the vehicle operative setting; headlamp dimming means responsive to subsequent momentary placement of the light switch in the second position for deenergizing the energized headlamps and energizing the deenergized headlamps each time the light switch is momentarily placed in the second position; a selectively operable switch having an inoperative setting and an operative setting in which it effects deenergization by rendering said lamp energization menas inoperable; a switch that is responsive to opening of one of the vehicle doors, the door responsive switch having a first setting when the door is closed and a second setting when the door is opened; a lamp deenergization circuit responsive to the door responsive switch and the ignition switch for automatically effecting deenergization of the vehicle lamps when the door switch is placed in the second setting after the ignition switch has been placed in the vehicle inoperative setting, the headlamps and parking lamps thereby being automatically extinguished when the vehicle operator opens the door to leave the vehicle; a switch that is responsive to operation of the vehicle and having a certain setting when the vehicle is inoperative; and a time delay circuit responsive to the selectively operable switch and the vehicle operation responsive switch for effecting said automatic deenergization of the vehicle lamps after a predetermined time has elapsed following operation of the vehicle, said time delay circuit being activated by placement of the selectively operable switch in the operative setting and said predetermined time commencing when said vehicle responsive switch is in the certain setting following operation of the vehicle.

* * * * *